United States Patent [19]

Sato et al.

[11] Patent Number: 4,477,621

[45] Date of Patent: Oct. 16, 1984

[54] RUBBER COMPOSITIONS FOR TIRE CONTAINING A SPECIFIC CARBON BLACK

[75] Inventors: Susumu Sato, Tokyo; Masaru Onda, Akigawa; Mikihiko Ikegami, Tokorozawa, all of Japan

[73] Assignee: Bridgestone Tire Company Limited, Tokyo, Japan

[21] Appl. No.: 503,453

[22] Filed: Jun. 13, 1983

[30] Foreign Application Priority Data

Jun. 25, 1982 [JP]  Japan ................................ 57-108379

[51] Int. Cl.³ ............................ C08K 3/04; B60C 1/00
[52] U.S. Cl. .................................... 524/496; 524/237; 524/495; 524/571; 524/575; 106/307; 152/209 R; 152/330 R
[58] Field of Search ............... 524/495, 496, 237, 571, 524/575; 260/746, 756, 763; 106/307; 152/330 R, 374, 209 R

[56] References Cited

U.S. PATENT DOCUMENTS

| | | | |
|---|---|---|---|
| 4,154,277 | 5/1979 | Sato et al. | 524/496 |
| 4,360,627 | 11/1982 | Okado et al. | 524/575 |
| 4,383,074 | 5/1983 | Kuan | 524/496 |
| 4,398,582 | 8/1983 | Yuto et al. | 524/496 |

FOREIGN PATENT DOCUMENTS

| | | | |
|---|---|---|---|
| 170937 | 10/1982 | Japan | 524/495 |
| 2004286 | 3/1979 | United Kingdom | 524/496 |

*Primary Examiner*—Herbert J. Lilling
*Attorney, Agent, or Firm*—Sughrue, Mion, Zinn, Macpeak & Seas

[57] ABSTRACT

A rubber composition for use in tire having good reinforcing properties and fatigue properties and an improved heat build-up is disclosed, which comprises 30 to 60 parts by weight, based on 100 parts by weight of rubber, of a carbon black having a nitrogen adsorption value ($N_2SA$) of 35 to 105 m²/g, a DBP absorption value of 140 to 200 ml/100 g, a 24M4DBP absorption value of 60 to 120 ml/100 g and a $\Delta DBP$ of 50 to 110 ml/100 g defined by $\Delta DBP = DBP$ absorption value $-$ 24M4DBP absorption value.

4 Claims, No Drawings

RUBBER COMPOSITIONS FOR TIRE CONTAINING A SPECIFIC CARBON BLACK

BACKGROUND OF THE INVENTION

1. Field of the Invention

This invention relates to rubber compositions for use in tires, which improve heat build-up by using carbon black with an improved higher order structure and are useful in the improvement of low rolling resistance of the tire.

2. Description of the Prior Art

The development of low fuel consumption tires has been promoted in correspondence with social demands directed to energy-saving. As a part of this development, a requirement exists to develop rubber compositions having good reinforcing properties and fatigue properties and an improved heat build-up.

As a countermeasure for such demand, it has been attempted to improve the heat build-up by making a half value width [$\Delta D_{50}$ (st)] in aggregate distribution of carbon black large as disclosed in Japanese Patent laid open No. 56-106,936, which is mainly resulting in success as a rubber composition for tire tread.

Among rubber compositions suitable for use in portions other than the tire tread using low heat build-up carbon black, however, rubber compositions satisfying both fatigue properties and heat build-up are not still obtained at present.

That is, in these rubber compositions, when the structure of carbon black is made high, modulus of elasticity of rubber increases, so that if the modulus of elasticity is fixed, the amount of carbon black added can be reduced, which is advantageous in heat build-up, but the fatigue properties of rubber lower, which is apt to cause separation between carcass plies or the like and becomes disadvantageous in the durability of the tire. Therefore, the attempt for reconciling the heat build-up and fatigue properties has been unsuccessful at present.

SUMMARY OF THE INVENTION

The inventors have made various studies with respect to the relation between the higher order structure (structure characteristic) of carbon black and the heat build-up and fatigue properties of rubber composition and found that when the higher order structure based on a weak bond is made considerably large in the total higher order structure of carbon black, there is obtained low heat build-up carbon black, which is useful even in the fatigue properties. Also a rubber composition applicable for portions other than tire tread having an improved heat build-up is obtained by using such carbon black as a reinforcing material, and as a result the invention has been accomplished.

Namely, the invention lies in a rubber composition for use in tire, which contains carbon black having a nitrogen adsorption value ($N_2SA$) of 35 to 105 $m^2/g$, a DBP absorption value of 140 to 200 ml/100 g, a 24M4DBP absorption value of 60 to 120 ml/100 g and a $\Delta DBP$ of 50 to 110 ml/100 g defined by $\Delta DBP = DBP$ absorption value $-$ 24M4DBP absorption value. In this case, $\Delta DBP$ is a value obtained by subtracting an amount of strong higher order structure defined by 24M4DBP absorption value from an amount of total higher order structure defined by DBP absorption value, and represents a fragile higher order structure based on weak bond.

In the carbon black according to the invention, the nitrogen adsorption value ($N_2SA$) is measured according to ASTM D-3037, the DBP absorption value is measured according to JIS K-6221, and the 24M4DBP absorption value is measured according to ASTM D-3493.

DETAILED DESCRIPTION OF THE INVENTION

In the rubber composition according to the invention, the carbon black is compounded in an amount of 30–60 parts by weight, preferably 40–50 parts by weight, based on 100 parts by weight of diene rubber.

As the diene rubber, use may be made of at least one rubber selected from natural rubber, synthetic polyisoprene rubber, styrene-butadiene copolymer rubber, polybutadiene rubber, ethylene-propylene-diene terpolymer rubber, chloroprene rubber, butyl rubber, halogenated butyl rubber, butadieneacrylonitrile copolymer rubber and the like.

According to the invention, $\Delta DBP$ of the carbon black can be made into a range of 50–110 ml/100 g when the $N_2SA$ is 35–105 $m^2/g$, the DBP absorption value is 140–200 ml/100 g and the 24M4DBP absorption value is 60–120 ml/100 g.

When $\Delta DBP$ is less than 50 ml/100 g, the orientation fatigue properties of the rubber composition are deteriorated and the peeling resistance lowers, so that the object of the invention cannot be achieved. While, when $\Delta DBP$ exceeds 110 ml/100 g, the breaking strength of the rubber composition lowers, so that the resulting rubber composition is inapplicable for use in a tire.

When carbon black according to the invention is produced by an oil furnace process, the resulting hard and soft carbon blacks develop the same effect. Particularly, carbon blacks having $N_2SA$ of 35–65 $m^2/g$, DBP absorption value of 140–200 ml/100 g, 24M4DBP absorption value of 60–120 ml/100 g and $\Delta DBP$ of 50–110 ml/100 g, preferably 65–110 ml/100 g are suitable for use in portions other than tire tread and are preferable.

When not only the amount of higher order structure is large but also the amount of fragile higher order structure based on weak bond is large as mentioned above, a part of the higher order structure is broken in the kneading of the rubber composition or during the working thereof to form particles of low structure carbon black, which are dispersed in the rubber composition. This fact is considered to prevent or mitigate the fatigue properties of rubber such as the lowering of the peeling resistance in each portion of the tire and the like.

A simple blend of high structure carbon black and low structure carbon black is different from the carbon black according to the invention in the dispersion and distribution states of carbon black during the kneading, so that it cannot develop the peculiar effect aimed at the invention.

Among carbon blacks according to the invention, carbon black having $N_2SA$ of not more than 65 $m^2/g$ is produced in the same manner as disclosed in Japanese Patent No. 1,059,132 (hereinafter referred to as reference literature) aiming at the production of high structure carbon black by using the same apparatus for the production of a so-called soft grade carbon black as used in the reference literature. In the reference literature,there is used a substantially cylindrical furnace lined with a refractory material for the production of furnace-type carbon black, whereby carbon black is produced as follows: that is, a hydrocarbon feedstock is continuously injected from an inlet of the furnace into the inside thereof in the axial direction, while a fuel and an air are introduced from the inlet of the furnace into the inside thereof in a direction tangent to the sidewall of the furnace, respectively, to produce a flow of high-temperature combustion gas (or a unidirectional flow) and further an air is introduced from the sidewall of the furnace into the inside thereof at a position near to the position producing the unidirectional flow to produce an air flow rotating in a direction opposite to the unidirectional flow (i.e. opposite directional flow), at a position where a disturbed atmosphere of high-temperature combustion gas is formed. The injected feedstock is thermal-decomposed by contacting with the high-temperature combustion gas under the disturbed atmosphere to form a hot gas flow of carbon black suspension, which is then quenched to stop the reaction and thereafter the resulting carbon black is collected. In Example 1 of the reference literature, there is a described that the cylindrical furnace used has an inner diameter of 60 cm and is provided with a pair of fuel and air ducts (unidirectional tangent air duct) each being arranged near the inlet of the furnace and having an inner diameter of 5 cm and a pair of air ducts (opposite directional tangent air duct) arranged at a central distance of 15 cm from the above duct and having an inner diameter of 5 cm. According to the reference literature, the disturbed atmosphere of high-temperature combustion gas is formed in a combustion zone near the inlet of the furnace inside thereof by fuel and air flowing in the unidirection and air flowing in the opposite direction, so that droplets of the feedstock injected into the disturbed atmosphere are subjected to thermal decomposition and after-reaction during the passing through the combustion zone and a reaction zone communicated therewith, whereby carbon black having a sufficiently developed structure is produced and then quenched together with high-temperature gas to a temperature of not more than 1,000° C., usually 400°–600° C. by means of a quenching device arranged in a cooling zone communicating with a rear end of the reaction zone to stop the reaction without being subjected to a secondary heat change. Furthermore, according to the reference literature, the quality and properties of carbon black can be controlled to desirable values by properly combining an operation for increasing or decreasing total feeding amount of air (kg/hr) to the amount of feedstock injected into the furnace (l/hr) with an operation for increasing or decreasing a ratio of unidirectional air flowing amount (kg/hr) to opposite directional air flowing amount (kg/hr). As apparent from the above, therefore, the method and apparatus described in the reference literature are suitable for the production of carbon black having $H_2SA$ of not more than 65 $m^2/g$ according to the invention.

Moreover, the application of feedstock having a high value of BMCI (Bureau of Mines Correlation Index) to the aforementioned production method is more preferable in the production of carbon black having properties specified in the invention.

Carbon blacks A, B, C and D to be used in tires No. 3, 4, 7 and 8 as mentioned later were produced according to the production method of the reference literature by using the same apparatus as used in Example 1 of the reference literature (provided that the diameter of each of ducts for unidirectional and opposite directional air flows is 10 cm). In this case, a coal series oil having properties as shown in the following Table 1 was used as feedstock and the working conditions as shown in the following Table 2 were applied to the apparatus.

TABLE 1

|  |  | Distillation test | |
|---|---|---|---|
| Specific gravity (JIS K2249) (15/4° C.) | 1.1287 | I.B.P. 10% | 195° C. 233° C. |
| Kinematic viscosity (JIS K2283) (cst, 50° C.) | 11.63 | 20% 30% 40% | 266° C. 296° C. 320° C. |
| Water content (JIS K2275) (%) | 0.3 | 50% | 336° C. |
| Residual carbon (JIS K2270) (%) | 8.70 | | |
| Sulfur content (JIS K2273) (%) | 0.55 | | |
| Average molecular weight (ASTM D2224) | 175.8 | | |
| Carbon content (%) | 90.8 | | |
| Hydrogen content (%) | 5.3 | | |
| BMCI | 157 | | |

(Note)
I.B.P.: Initial boiling point

TABLE 2

| Carbon black | A | B | C | D |
|---|---|---|---|---|
| Amount of feedstock (l/hr) | 1,600 | 1,700 | 1,700 | 1,700 |
| Temperature of feedstock (°C.) | 159 | 198 | 204 | 162 |
| Injection pressure of feedstock (kg/cm$^2$) | 24 | 32 | 33 | 24 |
| (a) Amount of opposite directional flowing air (kg/hr) | 1,846 | 2,251 | 1,872 | 2,080 |
| (b) Amount of unidirectional flowing air (kg/hr) | 2,769 | 3,349 | 2,673 | 3,380 |
| (a)/(a) + (b) × 100 (%) | 40.0 | 40.2 | 41.2 | 38.2 |
| Amount of auxiliary fuel (l/hr) (C heavy oil) | 105 | 190 | 190 | 175 |
| Amount of air for injecting fuel (kg/hr) | 180 | 200 | 200 | 185 |
| Total air amount (kg/hr) | 4,800 | 5,800 | 4,745 | 5,645 |
| Distance from fuel injecting position to quenching position (m) | 5.5 | 6.0 | 6.0 | 5.5 |

As shown in Table 2, the heated feedstock was injected from the inlet of the furnace to the inside thereof in the axial direction under a pressure, while the fuel together with the unidirectional flowing air were charged into the inside of the furnace near the inlet thereof through the same duct while injecting and combusting. The resulting hot gas flow of carbon black suspension was quenched with water at a position of 5.5–6.0 m away from the feedstock injecting position.

Among carbon blacks according to the invention, carbon black having $N_2SA$ of more than 65 $m^2/g$ is produced by using an apparatus for the production of a so-called hard grade carbon black provided with a Venturi part.

That is, the apparatus for the production of carbon black according to the invention as mentioned above comprises a horizontally arranged cylindrical combustion gas filling chamber, a cylindrical reaction chamber for the production of carbon black coaxially connected to the filling chamber and having a diameter smaller than that of the filling chamber, an injection device for hydrocarbon feedstock held in a central axis of the filling chamber, a reaction continuing and quenching chamber coaxially connected to a rear end of the reaction chamber, and a flue connected to a rear end of the quenching chamber, which is lined with a refractory material and satisfies the following requirements:

(i) At least one inlet for combustion gas, whose central axis being located in a tangent direction of the filling chamber, is arranged in a front half portion of the filling chamber, through which is connected a substantially cylindrical combustion gas generating chamber and further a fuel combustion device is located in a central axis of the combustion gas generating chamber;

(ii) A Venturi is disposed between the filling chamber and the reaction chamber, and the feedstock injection device is retractably attached to the front end wall of the filling chamber in the central axis direction thereof, and further a heatshield cooling jacket is arranged on the outer wall of the feedstock injection device. Further, a tip of the feedstock injection device is located down the combustion gas inlet and above the inlet of the Venturi;

(iii) At least two nozzles for pressurized gas are arranged on an outer peripheral wall of the filling chamber near the feedstock injection device at symmetrically and equally spaced positions so as to crossly flow gases against the gas fluidizing layer inside the filling chamber; and (iv) A plurality of water spraying portions in a spraying device for the cooling water are retractably disposed in the outer wall of the quenching chamber having the same diameter as the reaction chamber at a substantially equal spaced distance.

The dimensions of each component constituting the above apparatus are shown together below.

| Combustion gas filling chamber | |
|---|---|
| Inner diameter | 850 mm |
| Length | 400 mm |
| Inlet for combustion gas (symmetrically spaced two inlets) | |
| Inner diameter | 200 mm |
| Central position | 100 mm from inner periphery of the filling chamber |
| Nozzle for pressurized gas (air) | |
| Inner diameter | 100 mm 4 nozzles |
| Central position | 70 mm from inner periphery of the filling chamber |
| Venturi | |
| Inlet length | 100 mm (conical angle: 127°) |
| Throat diameter | 300 mm |
| Throat length | 150 mm |
| Outlet length | 170 mm (conical angle: 30°) |
| Reaction chamber | |
| Diameter | 400 mm |
| Length up to position of first spraying portion | 350 mm |
| Reaction continuing and quenching chamber | |
| Length | 2,000 mm |

In the central axis of the combustion gas filling chamber is located a pressure-spraying type feedstock injection device provided with a heat shield water-cooled jacket.

In the combustion gas generating chamber is disposed an air-spraying type fuel (natural gas) combustion device.

A carbon black E to be used in tire No. 9 as mentioned later was produced by using the apparatus of the above mentioned structure. In this case, a coal series oil having properties as shown in the following Table 3 was used as a feedstock and the working conditions as shown in the following Table 4 were applied to the apparatus.

TABLE 3

| | | Distillation test | |
|---|---|---|---|
| Specific gravity (JIS K2249) (15/4° C.) | 1.1510 | I.B.P. 10% | 178° C. 223° C. |
| Kinematic viscosity (JIS K2283) (cst, 50° C.) | 38.0 | 30% 50% | 315° C. 374° C. |
| Water content (JIS K2275) (%) | 1.0 | | |
| Residual carbon (JIS K2270) (%) | 18.5 | | |
| Sulfur content (JIS K2273) (%) | 0.5 | | |
| Carbon content (%) | 90.5 | | |
| Hydrogen content (%) | 5.5 | | |
| BMCI | 164 | | |

TABLE 4

| Carbon black | E |
|---|---|
| Amount of feedstock (l/hr) | 1,600 |
| Temperature of feedstock (°C.) | 250 |
| Injection pressure of feedstock (kg/cm$^2$) | 30 |
| Amount of fuel charged into combustion gas generating chamber (kg/hr) | 240 |
| Amount of air for combusting fuel (kg/hr) | 5,224 |
| Total amount of pressurized air passing through nozzles (kg/hr) | 900 |
| Air temperature (°C.) | 600 |
| Distance from front end of reaction chamber to working position of spraying device for cooling water (mm) | 2,000 |

The carbon blacks used in the invention are not only advantageous in the heat build-up and fatigue properties of the rubber composition but also good in the kneadability during the kneading with a Banbury mixer, so that it is advantageous in view of the improvement of tire productivity.

In the rubber composition according to the invention, a vulcanizing agent, a vulcanization accelerator, an antioxidant, a vulcanization assistant, a softener, a plasticizer and the like may properly be compounded in the usual manner.

As previously mentioned, the rubber composition according to the invention is applied to various tire portions other than tire tread. More exactly, it is used in the tire portions such as coating rubber for breaker and carcass ply, squeeze rubber, cushion rubber, sidewall rubber, inner liner rubber, rubber for bead portion, tread base rubber and the like.

The invention will be described in detail with reference to the following example.

EXAMPLE

Rubber compositions were produced by using two commercially available carbon blacks FEF (made by Asahi Carbon K.K.) and N-339 (made by Toyo Continental Carbon K.K.) and five carbon blacks A-E shown in Tables 2 and 4, respectively, according to a compounding recipe a shown in the following Table 5 by means of a usual Banbury mixer.

TABLE 5

| Ingredient | Part by weight |
|---|---|
| Natural rubber | 100 |
| Carbon black | variable as shown in Table 6 |
| Aromatic oil | 5 |
| Stearic acid | 3 |

TABLE 5-continued

| Ingredient | Part by weight |
| --- | --- |
| Antioxidant (IPPD)*1 | 1 |
| Zinc white | 5 |
| Vulcanization accelerator*2 | 0.5 |
| Sulfur | 2.5 |

*1 N—phenyl-N'—isopropyl-p-phenylenediamine, made by Ohuchi Shinko Kagaku K.K., Nocrac 810NA
*2 N—cyclohexyl-2-benzothiazylsulfenamide, made by Ohuchi Shinko Kagaku K.K., Nocceler CZ Each of the resulting rubber compositions was used in tread base rubber, breaker coating rubber, carcass ply coating rubber and squeeze rubber for lug-type bias tires for truck and bus having a size of 10.00–20 14 ply rating to prepare a tire.

In this tire, two cord layers each containing nylon-66 cords of 840 d/2 and coated in the usual manner were used as a breaker, and six cord plies each containing nylon-6 cords of 1,890 d/2 and coated in the usual manner were used as carcass.

The rolling resistance and peeling resistance between breaker layers or breaker layer and carcass ply were evaluated with respect to nine tires to obtain results as shown in the following Table 6. The evaluation of these properties was made as follows:

Rolling resistance

A test tire subjected to an internal pressure of 6.75 kg/cm$^2$ was run on a drum at a speed of 80 km/hr under a JIS 100% load for 1 hour and thereafter the driving of the drum was stopped, during which a running distance required for decelerating up to a speed of 40 km/hr was measured. Then, the rolling resistance was represented as an index according to the following equation:

$$\frac{\text{Running distance of test tire}}{\text{Running distance of tire No. 1}} \times 100$$

The higher the index value, the better the property.

Peeling resistance

After a test tire was run on a general road over a distance of 60,000 km, samples were cut out from the tire at four positions with a width of 3 cm parallel to the radial direction of the tire and subjected to a peeling test at a measuring width of 2.5 cm by means of an Instron type tensile tester. The peeling resistance was an average value of four samples.

| Tire No. | 1 Comparative Example | 2 Comparative Example | 3 Example | 4 Example | 5 Comparative Example | 6 Comparative Example | 7 Example | 8 Example | 9 Example |
| --- | --- | --- | --- | --- | --- | --- | --- | --- | --- |
| Kind of carbon black | FEF | N-339 | A | B | B | B | C | D | E |
| Nitrogen adsorption value N$_2$SA (m$^2$/g) | 40 | 95 | 45 | 49 | — | — | 37 | 63 | 78 |
| DBP absorption value (ml/100 g) | 110 | 120 | 190 | 163 | 163 | 146 | 178 | 163 | 163 |
| 24M4DBP absorption value (ml/100g) | 82 | 100 | 88 | 88 | — | — | 92 | 100 | 105 |
| ΔDBP (ml/100 g) | 28 | 20 | 102 | 75 | — | — | 54 | 78 | 58 |
| Amount of carbon black (part by weight) | 45 | 45 | 45 | 45 | 25 | 65 | 45 | 45 | 45 |
| Index of rolling resistance | 100 | 80 | 120 | 120 | 125 | 85 | 125 | 120 | 105 |
| Peeling resistance (kg/2.5 cm) | | | | | | | | | |
| between breaker layers | 32 | 50 | 48 | 50 | 24 | 38 | 39 | 51 | 50 |
| between breaker layer and carcass ply | 31 | 53 | 50 | 47 | 21 | 35 | 43 | 54 | 55 |

As apparent from the data of Table 6, the rubber compositions containing the carbon black according to the invention are fairly excellent in the rolling resistance as compared with the rubber composition containing carbon black N-339 and also the peeling resistance thereof is considerably improved as compared with that of the rubber composition containing carbon black FEF, so that it is apparent that the rubber compositions according to the invention simultaneously improve both the heat build-up and fatigue properties.

What is claimed is:

1. A rubber composition for use in tire, comprising 30 to 60 parts by weight, based on 100 parts by weight of diene rubber, of a carbon black having a nitrogen adsorption value (N$_2$SA) of 35 to 105 m$^2$/g, a DBP absorption value of 140 to 200 ml/100 g, a 24M4DBP absorption value of 60 to 120 ml/100 g and a ΔDBP of 50 to 110 ml/100 g defined by ΔDBP=DBP absorption value−24M4DBP absorption value.

2. A rubber composition according to claim 1, wherein said carbon black is compounded in an amount of 40 to 50 parts by weight based on 100 parts by weight of diene rubber.

3. A rubber composition according to claim 1, wherein said diene rubber is at least one rubber selected from natural rubber, synthetic polyisoprene rubber, styrene-butadiene copolymer rubber, polybutadiene rubber, ethylene-propylene-diene terpolymer rubber, chloroprene rubber, butyl rubber, halogenated butyl rubber and butadiene-acrylonitrile copolymer rubber.

4. A rubber composition according to claim 1, wherein said ΔDBP is 65 to 110 ml/100 g.

* * * * *